United States Patent
Linares

[11] Patent Number: 5,392,876
[45] Date of Patent: Feb. 28, 1995

[54] ANTI-THEFT METHOD AND DEVICE FOR AUTOMOTIVE VEHICLES

[76] Inventor: Francisco J. Linares, P.O. Box 6833, 3741 Saratoga St., Pico Rivera, Calif. 90660

[21] Appl. No.: 115,979
[22] Filed: Sep. 1, 1993
[51] Int. Cl.⁶ .............................................. B60K 27/00
[52] U.S. Cl. ....................................... 180/287; 188/353
[58] Field of Search ........................ 180/287; 188/353; 303/89

[56] References Cited

U.S. PATENT DOCUMENTS

| | | | |
|---|---|---|---|
| 3,559,755 | 2/1971 | Pond | 180/287 |
| 4,579,202 | 4/1986 | McIntosh | 180/287 |
| 4,881,615 | 11/1989 | Conway | 180/287 |
| 4,934,492 | 6/1990 | Hayes-Sheen | 188/353 |

Primary Examiner—Kenneth R. Rice
Attorney, Agent, or Firm—Connor & Associates; John J. Connors

[57] ABSTRACT

Disclosed is a method and device for preventing theft of an automotive vehicle, in particular, one which engages the brakes to prevent the vehicle from moving. An anti-theft device is coupled to the brake system, and, upon leaving the vehicle, manually actuating a concealed switch to enable the anti-theft device. The device is designed so that it is not operable until the brakes are operated by the thief. Once the brake system has been used by the thief after actuating the switch, engagement of the brake system is maintained, preventing movement of the vehicle.

11 Claims, 2 Drawing Sheets

ANTI-THEFT METHOD AND DEVICE FOR AUTOMOTIVE VEHICLES

BACKGROUND OF THE INVENTION

1. Field of the Invention

This invention relates to an anti-theft device for an automotive vehicle, in particular, one which engages the brakes to prevent the vehicle from moving.

2. Background Discussion

Automotive theft is a serious problem, and various anti-theft devices have been proposed. Many of these devices are very expensive and difficult to install. It is the objective of this invention to provide an anti-theft device which is inexpensive to manufacture and simple to install.

SUMMARY OF THE INVENTION

Broadly, the invention is a method for preventing theft of an automotive vehicle by engaging the brake system of the vehicle by coupling an anti-theft device to the brake system, and, upon leaving the vehicle, manually actuating a concealed switch to enable the anti-theft device. The device is designed so that it is not operable until the brakes are operated by the thief. Once the brake system has been used by the thief after actuating the switch, engagement of the brake system is maintained, preventing movement of the vehicle.

The device of this invention has several features, no single one of which is solely responsible for its desirable attributes. Without limiting the scope of this invention as expressed by the claims which follow, its more prominent features will now be discussed briefly. After considering this discussion, and particularly after reading the section entitled, "DETAILED DESCRIPTION OF THE PREFERRED EMBODIMENT," one will understand how the features of this invention provide its advantages, which include low cost manufacture and simplicity of installation.

The first feature of this invention is that it engages the brake system to prevent movement of the vehicle. The anti-theft device of this invention uses the vehicle's hydraulic brake system that includes a reservoir of brake fluid. This fluid is in communication with brakes for the vehicle under the control of an operator actuated brake member, for example, a conventional brake pedal which the operator depresses with his or her foot.

The second feature of this invention is that the device includes a body and a passageway through the body having one end in communication with the reservoir and another end in communication with the brakes. The passageway has between these ends first and second branch lines through which the fluid flows from the reservoir to the brakes. A one way valve in the first branch line that permits fluid to flow only from the first end to the second end. A stopper member movable between a first position allows fluid to flow through the second branch line and a second position which blocks the second branch line to prevent fluid flow through this line.

The third feature is an electronic actuator such as for example a solenoid controls the position of the stopper member. When the electronic actuator is energized, it moves the stopper member from the first position to the second position. A p o w e r source such as the vehicle's battery energizes the electronic actuator through a control circuit. This control circuit includes the concealed switch which the operator manually closes upon leaving the vehicle to enable the electronic actuator to be energized. A second switch, when closed, completes a circuit to energize the electronic actuator. This second switch is actuated when the thief, who is an illegal operator of the vehicle, actuates the brake member. This closed the second switch to energize the electronic actuator, and thereby maintain the brakes in an engaged condition. The preferred second switch is, for example, a conventional brake light switch responsive to pressurization of the brake fluid.

DESCRIPTION OF THE DRAWING

The preferred embodiment of this invention, illustrating all its features, will now be discussed in detail. This embodiment depicts the novel and non-obvious method and device Of this invention shown in the accompanying drawing, which is for illustrative purposes only. This drawing includes the following figures (Figs.), with like numerals indicating like parts.

DESCRIPTION OF THE PREFERRED EMBODIMENT

Figure 1:
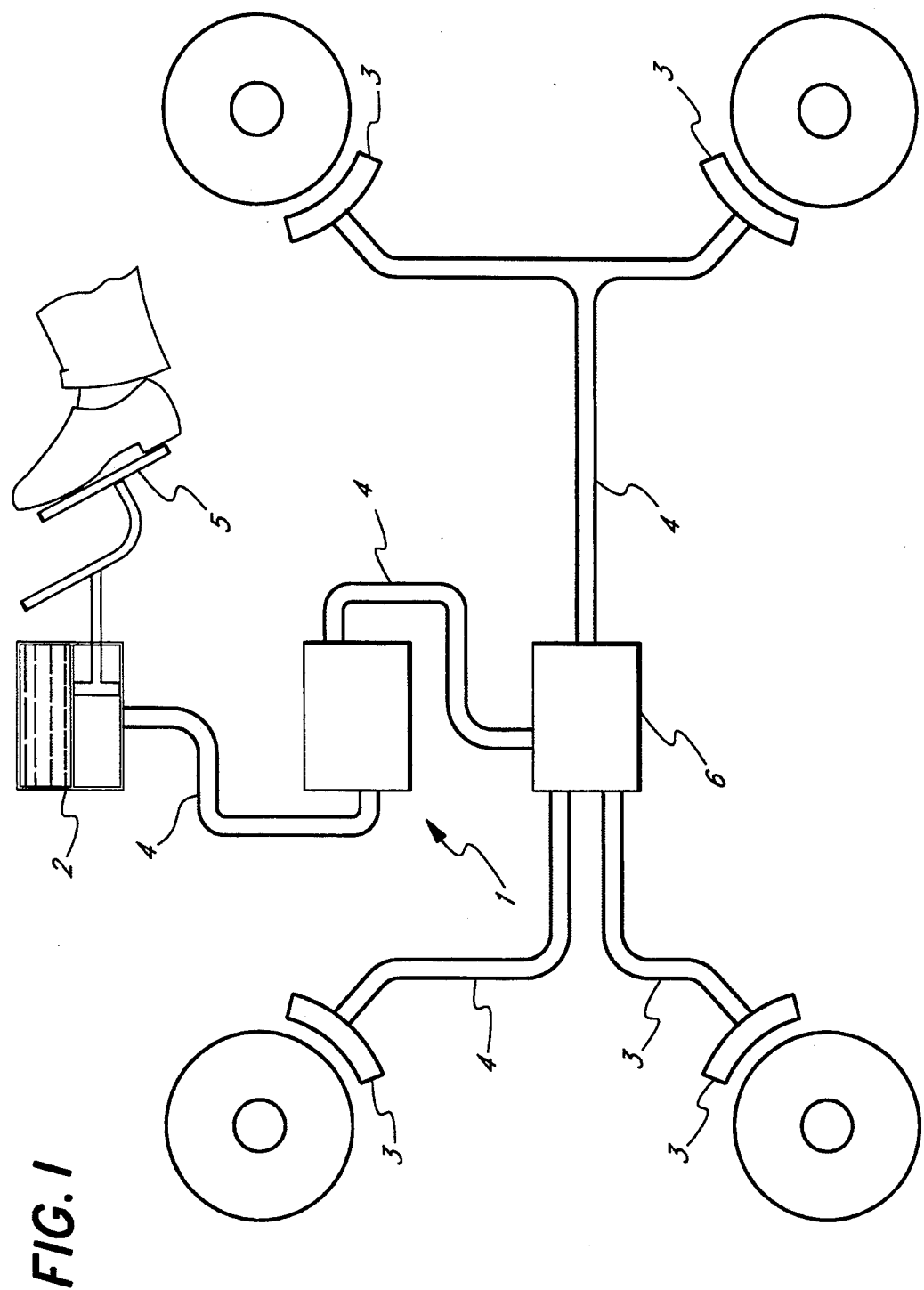
FIG. 1 is a schematic illustration of a conventional hydraulic system with the anti-theft device installed in the system.

The anti-theft device 1 of this invention is particularly adapted to be used with the hydraulic brake system of an automotive vehicle. As depicted in FIG. 1, such a brake system includes a master cylinder reservoir 2 of brake fluid in communication with the brakes 3 of the vehicle through brake lines 4. A brake pedal 5 which is actuated by the operator of the vehicle causes the fluid in the brake lines 4 to be pressurized to actuate, for example, conventional drum and disc brakes 3. Fluid flows from the master cylinder reservoir 2 through the anti-theft device 1 of this invention, then commonly through a proportioning valve 6 which meters the hydraulic pressure, and finally through the brake lines 4 to the front and rear brakes 3.

The anti-theft device 1 includes a rigid body member 7 with a fluid passageway 8 extending between opposed ends of the body member 7. One of these ends 9 is connected through at least one of the lines 4 coming from the reservoir 2. The other end 10 is connected to the brake lines 4 leading to the brakes 3. The passageway 8 diverges at one intermediate point 11 into a lower branch line 12 and an upper branch line 13 which downstream of this point again converge into the passageway 8 prior to exiting the other end 10. There is at this point of convergence 14 an intermediate line 15 which terminates at a conventional brake switch 16 which is responsive to the pressurization of the brake fluid by the operator pushing against the brake pedal 5. There is a stopper member 17 in the upper branch line 13 which is moveable between a closed position 18 and an open position 19. In the closed position 18 it prevents the flow of brake fluid through upper branch line 13 and in the open position 19 it allows fluid to flow through the upper branch line 13. In the lower branch line 12 is a check valve 20 which only allows fluid to flow from the one end 9 and out the other end 10. A solenoid 21 is operably connected to the stopper member 17 and upon energization of this solenoid 21 moves this stopper member 17 to the closed position 18 which prevents fluid to flow through the upper branch line 13, specifically flowing in a direction towards or returning brake fluid to the reservoir 2.

Figure 2:
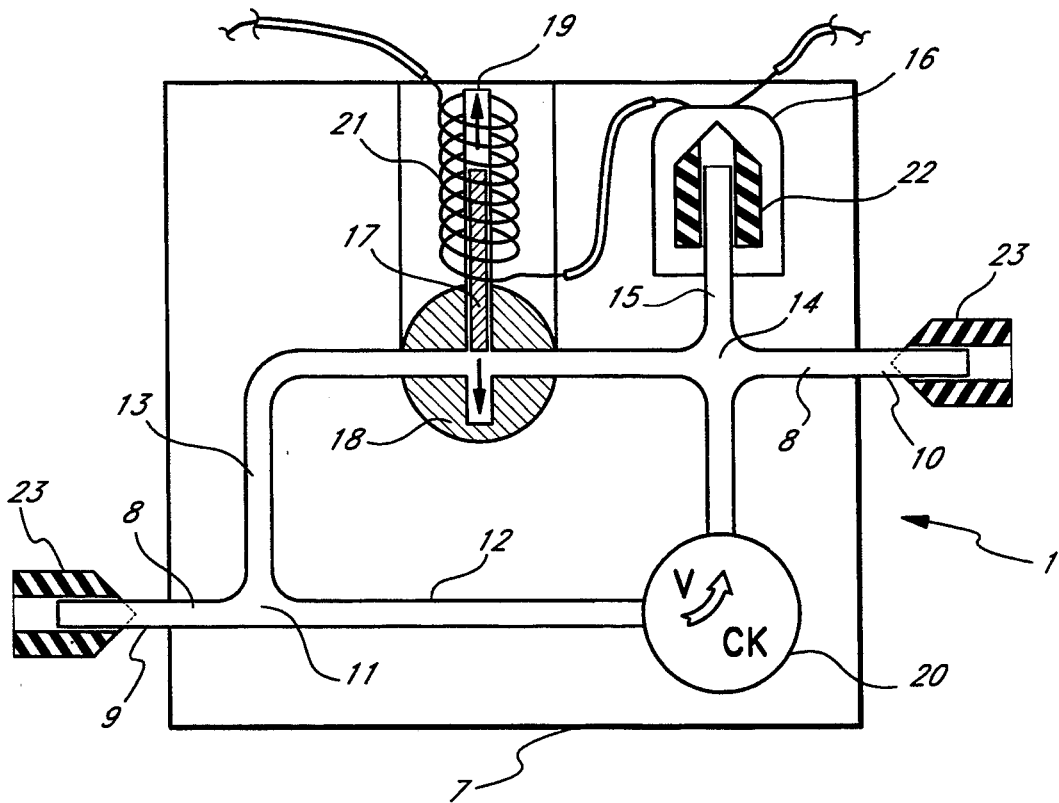
FIG. 2 is a cross-sectional view of the anti-theft device of this invention.
Figure 3:
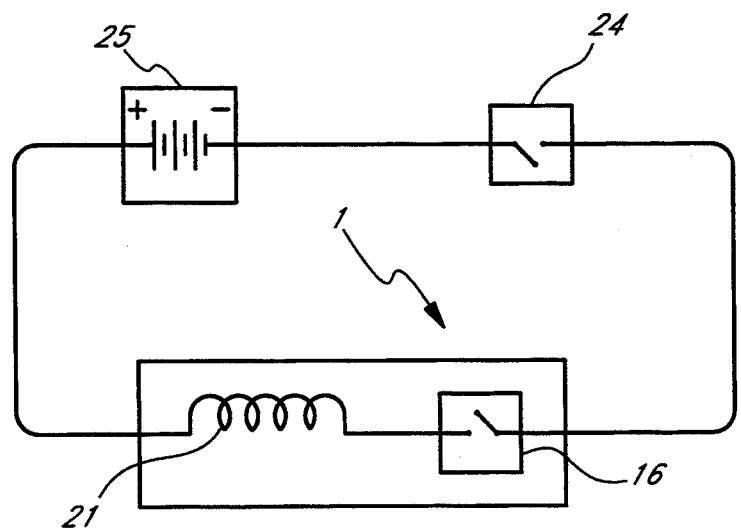
FIG. 3 is a schematic circuit diagram.

In accordance with an important feature of this invention, a kit (not shown) is provided which enables the device to be easily connected to the vehicle's brake system. This kit basically includes the body member 7 and a port element 22 (see FIG. 2) that allows the brake switch 16 to be screwed into position. The one end 9 and other end 10 are provided with threaded connectors or couplers 22 for attaching the body member 7 to the brake line 4. The solenoid 21 and check valve 20 are in positions depicted in FIG. 2. With the body member 7 connected in the brake line 4 and the brake switch 16 attached to the body member 7 (as depicted in FIG. 2), a manually-actuated switch 24 (FIG. 3) is concealed in or on the vehicle at a location which the operator knows, but no one else. When the operator leaves the vehicle, this manually-actuated switch 24 is closed. When in the closed position, the solenoid 21 is enabled but not as yet energized. The solenoid 21 is energized from the battery 25 when the brake switch 24 is actuated.

The anti-theft device 1 of this invention operates as follows: The stopper member 17 is initially in the open position 19 to enable brake fluid to flow through the upper branch line 13 exiting at the one end 9. The operator upon leaving the vehicle closes the switch 24. Thus, if a thief, upon actuating the brake pedal 5 pressurizes fluid to actuate the brake switch 16. When this occurs, a circuit is closed to energize the solenoid 21 from the battery 25 to move the stopper member 17 to the closed position 18 which closes the upper branch line 13, preventing brake fluid to return to the reservoir 2. This locks the brake system, preventing movement of the vehicle. The fluid remains pressurized, maintaining the brakes 3 in the locked position. To release the brakes 3, the operator, who is the only one who knows where the manually actuated switch 24 is located, simply switches this switch 24 to the off position, allowing the stopper member 17 to return to the open position 19 so that brake fluid will then return to the reservoir 2.

SCOPE OF THE INVENTION

The above presents a description of the best mode contemplated of carrying out the present invention, and of the manner and process of making and using it, in such full, clear, concise, and exact terms as to enable any person skilled in the art to which it pertains to make and use this invention. This invention is, however, susceptible to modifications and alternate constructions from that discussed above which are fully equivalent. Consequently, it is not the intention to limit this invention to the particular embodiment disclosed. On the contrary, the intention is to cover all modifications and alternate constructions coming within the spirit and scope of the invention as generally expressed by the following claims, which particularly point out and distinctly claim the subject matter of the invention.

What is claimed is:

1. An anti-theft device for an automotive vehicle which uses a hydraulic brake system that includes a reservoir of brake fluid in fluid communication with brakes for the vehicle under the control of an operator actuated brake member for engaging the brakes, including a body, a passageway through the body having one end in communication with the reservoir and another end in communication with the brakes, said passageway having between said ends first and second branch lines through which the fluid flows from the reservoir to the brakes, a one way valve in the first branch line that permits fluid to flow only from the first end to the second end, a stopper member movable between a first position which allows fluid to flow through said second branch line and a second position which blocks said second branch line to prevent fluid flow through said second branch line, an electronic actuator for the stopper member which upon being energized moves the stopper member from the first position to the second position, and a control circuit including a first switch element which is manually closed to enable the electronic actuator to be energized, and a second switch which is actuated when the operator actuates the brake member to complete a circuit which energize the electronic actuator, and thereby maintains said brakes in an engaged condition.

2. The anti-theft device of claim 1 where the first and second branch lines are a pair of conduits which at a first intermediate position between said ends diverge from the passageway as said first and second branch lines and then at a second intermediate point between said ends converge into said passageway.

3. The anti-theft device of claim 1 where the second switch is actuated by application of pressure to the brake fluid.

4. The anti-theft device of claim 1 where the electronic actuator is a solenoid.

5. A method for preventing theft of an automotive vehicle by engaging the brake system of the vehicle, comprising (a) coupling an anti-theft device to the brake system, said device including
   a manually actuated switch which is attached to the vehicle in a concealed location, said switch enabling said anti-theft device when actuated, and
   means for maintaining said brake system engaged after initially engaging said brake system after actuating said switch, including a brake actuated switch operated upon engaging said brake system, and (b) manually actuating said switch to enable said anti-theft device.

6. The method of claim 5 where said brake system is maintained engaged by precluding the return of hydraulic fluid to a reservoir of said fluid in said brake system.

7. The method of claim 6 where said step of precluding the return of said hydraulic fluid is carried out by blocking a port of said reservoir.

8. An anti-theft device for an automotive vehicle which engages the brake system for the vehicle, including
   means for coupling the anti-theft device to the brake system,
   a manually actuated switch which is attached to the vehicle in a concealed location, said switch enabling said anti-theft device when actuated, and
   means for maintaining said brake system engaged after initially engaging said brake system after actuating said switch, including a brake actuated switch operated upon engaging said brake system.

9. The device of claim 8 including means for precluding the return of hydraulic fluid to a reservoir of said fluid in said brake system to maintain engagement of said brake system.

10. The device of claim 9 the means for precluding the return of said hydraulic fluid comprises a member which blocks a port of said reservoir.

11. A kit of parts for installation on an automotive vehicle to prevent theft of the vehicle, comprising
   a body,
   a passageway through the body having one end adapted to be connected to a reservoir of brake fluid in the brake system for the vehicle and another end in communication with the brake system,
   said passageway having between said ends first and second branch lines through which the fluid flows from the reservoir to the brake system,
   a one way valve in the first branch line that permits fluid to flow only from the first end to the second end,
   a stopper member movable between a first position which allows fluid to flow through said second branch line and a second position which blocks said second branch line to prevent fluid flow through said second branch line,
   an electronic actuator for the stopper member which upon being energized moves the stopper member from the first position to the second position,
   a control circuit including a first switch element which is manually closed to enable the electronic actuator to be energized, said first switch being adapted to be attached to the vehicle in concealed location, and
   a line adapted to place the passageway into fluid communication with a second switch in the vehicle which is actuated when the operator actuates the brake member to complete a circuit which energize the electronic actuator, and thereby maintains said brakes in an engaged condition.

* * * * *